(12) United States Patent
Alexander et al.

(10) Patent No.: US 8,215,051 B2
(45) Date of Patent: Jul. 10, 2012

(54) PEST CONTROL MATERIALS

(75) Inventors: Bruce Alexander, Midlothian (GB); Stephen John Russell, Harrogate (GB)

(73) Assignee: Insectshield Limited, Leeds (GB)

( * ) Notice: Subject to any disclaimer, the term of this patent is extended or adjusted under 35 U.S.C. 154(b) by 302 days.

(21) Appl. No.: 12/306,688

(22) PCT Filed: Jun. 14, 2007

(86) PCT No.: PCT/GB2007/002230
§ 371 (c)(1), (2), (4) Date: Mar. 3, 2009

(87) PCT Pub. No.: WO2008/001044
PCT Pub. Date: Jan. 3, 2008

(65) Prior Publication Data
US 2009/0288334 A1    Nov. 26, 2009

(30) Foreign Application Priority Data
Jun. 28, 2006 (GB) .................................. 0612788.0

(51) Int. Cl.
*A01M 1/00* (2006.01)
*A01M 1/18* (2006.01)
*A01M 1/24* (2006.01)

(52) U.S. Cl. ............. 43/132.1; 43/108; 43/119; 43/124; 47/32.4; 52/101; 451/532; 451/536

(58) Field of Classification Search ................. 43/132.1, 43/124, 108, 119, 118, 114; 47/32.4; 52/101; 51/294, 307, 308, 293; 451/536, 532, 537, 451/539, 526, 530
See application file for complete search history.

(56) References Cited

U.S. PATENT DOCUMENTS

| | | | | | |
|---|---|---|---|---|---|
| 414,606 | A | * | 11/1889 | Thum | 43/114 |
| 727,054 | A | * | 5/1903 | Arndt | 52/101 |
| 782,048 | A | * | 2/1905 | Perou | 47/32.4 |
| 1,619,945 | A | * | 3/1927 | Leslie | 43/132.1 |
| 1,879,813 | A | * | 9/1932 | Molitor | 47/32.4 |
| 2,315,772 | A | * | 4/1943 | Closs | 43/131 |
| 2,344,811 | A | * | 3/1944 | Gill | 2/4 |
| 2,425,235 | A | * | 8/1947 | Ferrante | 43/119 |
| 2,533,439 | A | * | 12/1950 | Elder | 28/166 |
| 2,557,047 | A | * | 6/1951 | Goepfert et al. | 51/308 |
| 2,593,781 | A | * | 4/1952 | Meis | 43/108 |
| 2,603,485 | A | * | 7/1952 | Countryman | 43/132.1 |
| 2,690,030 | A | * | 9/1954 | Thompson | 43/132.1 |
| 2,857,630 | A | * | 10/1958 | Bishop | 43/132.1 |
| 2,899,771 | A | * | 8/1959 | Burris, Jr. | 43/131 |
| 2,911,756 | A | * | 11/1959 | Geary | 43/114 |
| 2,952,938 | A | * | 9/1960 | Abrams | 43/131 |

(Continued)

FOREIGN PATENT DOCUMENTS

EP 1040756 A1 * 10/2000

(Continued)

*Primary Examiner* — Darren W Ark
(74) *Attorney, Agent, or Firm* — Mark W. Scott; David G. Maire; Beusse Wolter Sanks Mora & Maire, P.A.

(57) ABSTRACT

A pest control material (11), such as mosquito netting, has a surface (12) with abrasive/absorptive microprojections (13). Insect pests such as mosquitoes suffer damage to their cuticle, resulting in dehydration and/or invasion by microbial pathogens. The material is made by coating a fabric with abrasive and/or absorptive materials.

26 Claims, 2 Drawing Sheets

U.S. PATENT DOCUMENTS

| | | | | |
|---|---|---|---|---|
| 3,285,810 | A | * | 11/1966 | Hart .................... 43/131 |
| 3,767,785 | A | * | 10/1973 | Bordenca ................ 43/131 |
| 3,816,959 | A | * | 6/1974 | Nalle, Jr. .............. 47/32.4 |
| 3,826,036 | A | * | 7/1974 | Neugebauer ............ 43/132.1 |
| 3,896,995 | A | * | 7/1975 | Lelicoff ................ 43/132.1 |
| 4,319,423 | A | * | 3/1982 | Judd .................... 43/121 |
| 4,395,844 | A | * | 8/1983 | Jopson .................. 47/32.4 |
| 4,422,184 | A | * | 12/1983 | Myers .................... 2/4 |
| 4,765,982 | A | * | 8/1988 | Ronning et al. .......... 424/403 |
| 4,800,666 | A | * | 1/1989 | Lukehart ................ 43/4 |
| 4,823,520 | A | * | 4/1989 | Ebeling et al. .......... 52/101 |
| 4,958,456 | A | * | 9/1990 | Chaudoin et al. ........ 43/132.1 |
| 5,057,315 | A | * | 10/1991 | Gunner et al. .......... 43/132.1 |
| 5,057,316 | A | * | 10/1991 | Gunner et al. .......... 43/132.1 |
| 5,091,993 | A | * | 3/1992 | Merrill et al. .......... 2/4 |
| 5,094,045 | A | * | 3/1992 | Tamashiro .............. 52/101 |
| 5,111,610 | A | * | 5/1992 | Morisset ................ 43/132.1 |
| 5,159,778 | A | * | 11/1992 | Metzner et al. .......... 43/132.1 |
| 5,214,797 | A | * | 6/1993 | Tisdale .................. 2/455 |
| 5,233,787 | A | * | 8/1993 | Andersen ................ 43/132.1 |
| 5,238,681 | A | * | 8/1993 | Chang et al. ............ 43/132.1 |
| 5,249,307 | A | * | 10/1993 | Lemoine ................ 2/84 |
| 5,249,310 | A | * | 10/1993 | Forte .................... 2/239 |
| 5,303,502 | A | * | 4/1994 | Metzner et al. .......... 43/132.1 |
| 5,310,552 | A | * | 5/1994 | Gunner et al. .......... 43/132.1 |
| 5,341,511 | A | * | 8/1994 | Wells .................... 2/456 |
| 5,359,805 | A | * | 11/1994 | Kadokura ................ 43/108 |
| 5,417,017 | A | * | 5/1995 | Toutountzis ............ 52/101 |
| 5,427,784 | A | * | 6/1995 | Gunner et al. .......... 43/132.1 |
| 5,451,239 | A | * | 9/1995 | Sewell et al. .......... 52/101 |
| 5,529,589 | A | * | 6/1996 | Lynn et al. ............ 51/293 |
| 5,596,834 | A | * | 1/1997 | Ritter .................. 43/108 |
| 5,644,998 | A | * | 7/1997 | Krolick ................ 43/114 |
| 5,717,990 | A | * | 2/1998 | Alquist et al. .......... 2/4 |
| 6,108,968 | A | * | 8/2000 | Peng .................... 43/108 |
| 6,164,009 | A | * | 12/2000 | Clarke .................. 43/132.1 |
| 6,182,412 | B1 | * | 2/2001 | Traxler .................. 43/132.1 |
| 6,190,246 | B1 | * | 2/2001 | Parrott et al. .......... 451/536 |
| 6,298,610 | B2 | * | 10/2001 | Traxler .................. 43/132.1 |
| 6,308,473 | B1 | * | 10/2001 | Auck .................... 52/101 |
| 6,341,444 | B1 | * | 1/2002 | Cina et al. ............ 43/119 |
| 6,453,628 | B2 | * | 9/2002 | Traxler .................. 43/132.1 |
| 6,494,928 | B1 | * | 12/2002 | Hokkirigawa et al. .... 51/308 |
| 6,519,901 | B1 | * | 2/2003 | Nelson et al. .......... 43/124 |
| 6,568,123 | B2 | * | 5/2003 | Nelson et al. .......... 43/132.1 |
| 6,604,990 | B2 | * | 8/2003 | Cooper et al. .......... 451/526 |
| 6,672,952 | B1 | * | 1/2004 | Masmar et al. .......... 451/536 |
| 6,824,850 | B2 | * | 11/2004 | Nourigat ................ 43/132.1 |
| 6,881,483 | B2 | * | 4/2005 | McArdle et al. .......... 451/526 |
| RE39,223 | E | * | 8/2006 | Toutountzis ............ 52/101 |
| 7,147,544 | B2 | * | 12/2006 | Rosenflanz .............. 51/307 |
| 7,150,771 | B2 | * | 12/2006 | Keipert et al. .......... 451/526 |
| 7,232,364 | B2 | * | 6/2007 | Hibbard ................ 451/526 |
| 7,243,375 | B2 | * | 7/2007 | Seo ...................... 2/69 |
| 7,258,705 | B2 | * | 8/2007 | Woo et al. .............. 51/308 |
| 7,285,146 | B2 | * | 10/2007 | Petersen ................ 451/536 |
| 7,308,868 | B1 | * | 12/2007 | Borg et al. ............ 52/101 |
| 7,343,710 | B2 | * | 3/2008 | Metcalfe ................ 43/132.1 |
| 7,438,635 | B2 | * | 10/2008 | Hoglund ................ 451/532 |
| 7,541,050 | B2 | * | 6/2009 | Mori et al. ............ 424/489 |
| 7,690,971 | B2 | * | 4/2010 | Sung .................... 451/526 |
| 7,793,461 | B2 | * | 9/2010 | Klein .................... 43/132.1 |
| 7,793,920 | B2 | * | 9/2010 | Bauer et al. ............ 256/5 |
| 7,972,613 | B2 | * | 7/2011 | Schilling et al. ........ 43/119 |
| 2002/0026752 | A1 | * | 3/2002 | Culler et al. ............ 51/308 |
| 2002/0098789 | A1 | * | 7/2002 | Burke .................... 451/526 |
| 2003/0140554 | A1 | * | 7/2003 | Whitcomb ................ 47/32.4 |
| 2003/0186604 | A1 | * | 10/2003 | Nourigat ................ 43/114 |
| 2004/0033772 | A1 | * | 2/2004 | Goers .................... 451/526 |
| 2004/0200130 | A1 | * | 10/2004 | Klein .................... 43/114 |
| 2004/0216367 | A1 | * | 11/2004 | Klein .................... 43/114 |
| 2005/0060944 | A1 | * | 3/2005 | Culler et al. ............ 51/308 |
| 2005/0276979 | A1 | * | 12/2005 | Slutz et al. ............ 451/526 |
| 2006/0242910 | A1 | * | 11/2006 | You ...................... 51/308 |
| 2007/0054600 | A1 | * | 3/2007 | Watanabe et al. ........ 451/526 |
| 2007/0157507 | A1 | * | 7/2007 | Reid et al. ............ 43/132.1 |
| 2008/0066387 | A1 | * | 3/2008 | Bonner et al. .......... 51/293 |
| 2009/0000216 | A1 | * | 1/2009 | Kane et al. ............ 52/101 |
| 2009/0025310 | A1 | * | 1/2009 | Harris .................. 52/101 |
| 2009/0094954 | A1 | * | 4/2009 | Nakayama et al. ........ 55/524 |
| 2009/0220428 | A1 | * | 9/2009 | Grau et al. ............ 424/9.2 |
| 2010/0099343 | A1 | * | 4/2010 | Feng et al. ............ 451/532 |
| 2010/0132245 | A1 | * | 6/2010 | Vestergaard Frandsen .. 43/132.1 |
| 2010/0255764 | A1 | * | 10/2010 | Watanabe et al. ........ 451/526 |

FOREIGN PATENT DOCUMENTS

| | | | | |
|---|---|---|---|---|
| GB | | 1479238 | A * | 7/1977 |
| JP | | 01151646 | A * | 6/1989 |
| JP | | 11225648 | A * | 8/1999 |
| JP | | 2008092944 | A * | 4/2008 |
| WO | WO 2008/004711 | A2 * | 1/2008 |
| WO | WO 2008/153166 | A1 * | 12/2008 |

* cited by examiner

41

PEST CONTROL MATERIALS

This invention relates to pest control materials.

Mosquito nets act by providing a physical barrier to blood-sucking insects such as mosquitoes, thus preventing transmission of disease-causing pathogens to the user. The net does not kill or repel the insects, which continue to be attracted to the user because of the unrestricted passage of host odour and carbon dioxide across the mesh.

The effectiveness of mosquito nets can be increased by treating them with non-volatile chemical insecticides, such as pyrethroids. These are considered to be relatively safe for the user at the recommended dose and have no fumigant effect. The net continues to act as a "baited trap" attracting insects which are irritated, knocked down and ultimately killed by the insecticide. Such nets continue to be effective even if damaged, provided the insect touches the treated fabric.

To limit the dangers of intoxication to users during treatment and ensure more uniform coverage of the material with insecticide, mosquito nets are now sold with the insecticide already impregnated into the mesh. These require no further re-impregnation for 20-25 washes.

These pre-impregnated nets retain some of the disadvantages of those left untreated or treated by the users, i.e., (a) leaching of insecticide into the environment where it may cause detrimental effects to non-target organisms, (b) danger of inducing resistance to the insecticide used and other related chemicals in the target population as well as other pests (c) possible health problems related to long-term use, particularly by pregnant women and children under five who have the most urgent requirement for protection from malaria or other insect-borne diseases and are thus most likely to use these insecticide-impregnated nets The present invention represents a pest-control method that does not incorporate conventional chemical insecticides but kills and/or repels mosquitoes and other insect pests. It can be used in mosquito nets and other pest control devices and materials, including protective clothing, garden or crop netting and fleeces, protective bands for fruit trees, horse blankets, hairnets and filters for grain stores or flour mills. It could thus also replace or enhance the performance of the following:

(a) Midge screens or veils which require a very fine mesh to be effective (b) Insect repellents containing diethyltoluamide (DEET), citronella or other chemical which are effective for a limited period and may have health problems associated with their long-term use (c) Garden or crop netting (e.g. crop cover) and fleeces where mesh size or pore size again needs to be very fine, excluding the pest species but restricting the circulation of light, heat and moisture (d) Chemical pesticides used against agricultural and horticultural pests (costly, detrimental to the environment and non-target organisms)

(e) Horse blankets that cause discomfort to animals because of their weight (f) Repellent sprays containing citronella and eucalyptus that have limited effectiveness and are disliked by horses (g) Sticky bands placed around trees to trap pests that climb the trunks (h) Anti-louse shampoos containing harmful insecticides (i) Fly screens that restrict air flow (j) Filters and window screens used in flour mills and grain stores (k) Insect electrocution devices (l) Slug control methods of all types including copper bands, rings, mats, baited traps that act by irritating the animals to such a degree that they do not attempt to cross the treated surface.

(m) Slug pellets which contain active ingredients such as aluminium sulphate or chlorpyriphos (n) Covers to protect livestock from insect bites and to prevent downgrading of subsequent products due to defects (e.g. leather)

(m) Window blinds, covers and screens in domestic and commercial buildings and transport to protect occupants from insects.

The invention comprises a pest control material having a surface with microprojections.

The material may comprise a textile yarn, filament or thread.

The material may comprise a textile fabric.

The material may comprise a net.

The material may comprise a woven, knitted or non-woven fabric, or a combination of two or more such fabrics.

The material may comprise a solid sheet, e.g. of rubber or plastic, and may comprise a rubber or plastic tree band.

The surface may be a coating.

The microprojections may comprise an abrasive material and/or an absorptive material, and may comprise silica, which may be in the form of diatomaceous earth, or polycarbonate. Other materials that can be used include ceramic, glass and polymer compositions or mixtures thereof, granules of kaolin clay, synthetic hydrated silica, bentonite, Fubasami clay and terra alba, talc, inorganic minerals such as sericite, quartz, sulphur, activated carbon, calcium carbonate and hydrated silica, silica gels, borates, and other polymers such as polyamide, PMMA and other hard and potentially recycled polymers.

The microprojections may be of particles which may range in size from 5 µm upwards.

The material may be washable.

The material may incorporate a pest attractant. The pest attractant may comprise a semiochemical, such as a pheromone or kairomone.

The material may incorporate a pathogen, which may be a microbial pathogen such as fungal or bacterial spores.

The invention also comprises a method for controlling pests, comprising deploying any of the materials having microprojections above set forth.

The material may be deployed as a physical barrier to pests, and may be deployed for example in dwelling houses, workplaces, animal houses, storage facilities and vehicles such as automobiles, trains and boats. The material may be deployed, for example, as a window screen or window blind, or may be deployed as or as part of a garment, such for example as a veil. It may, of course, be deployed as a bed or mosquito net. For animal protection, it may, for example, be deployed as a horse blanket.

The material may be deployed to protect vegetation, such as trees and plants, and may be deployed as a tree band or plant ring, or as a crop tunnel, a cloche or protective netting.

The material may be deployed as a filter, and the invention comprises a filter comprising the material and anything containing or designed to contain such a filter, such as an air conditioning system or a vacuum cleaner.

The invention also comprises a method for making a pest control material, comprising causing a substrate to exhibit microprojections.

The microprojections may be applied to the substrate in a coating.

The microprojections may be abrasive and/or absorptive. Abrasive microparticles can abrade an insect exocuticle, allowing dehydration of the insect or ingress of pathogens, both of which can lead to deterioration of the condition of the insect and eventual death.

The coating may be a conventional textile coating, such as latex or an acrylic resin or a thermoplastic or thermosetting adhesive, and may be applied in a conventional fashion, except, of course, as may be required to be modified by the inclusion of particulate material affording the microprojections.

Generally speaking, the coating may be applied thinly, whereby to leave microprojections of particulate inclusion standing proud of the coating surface.

The surface of the invention may be created by thinly coating using any appropriate type of coating substance (e.g. latex, acrylic or other binder resin) containing abrasive/absorptive particles that is washable. Alternatively, the surface of the invention may be created by thermofusing abrasive/absorptive particles to any appropriate type of substrate. The microprojections may consist of absorptive/abrasive material such as diatomaceous earth, which is already used as a dust for the control of a variety of insect pests or other particles that act as an abrasive against the insect exocuticle. It may also consist of other absorptive and/or abrasive materials such as polycarbonate, applied singly or mixed with diatomaceous earth in different proportions. The invention thus represents a more efficient, concentrated way of exposing insect pests to the desiccant microparticles.

Assays in which mosquitoes are applied to netting coated with these microparticles reveal that the insects are repelled and survive significantly less time than those exposed to normal mesh. Death occurs as a result of dehydration following damage to the insect cuticle by contact with the microprojections. The insects are also more susceptible to attack by pathogenic fungi.

Depending on the application for which it is to be used, the invention may thus incorporate pathogens such as fungal spores as well as attractant semiochemicals (pheromones or kairomones).

Pest control materials, methods for their manufacture and ways of deploying them will now be described with reference to the accompanying drawings in which FIG. 1 is a section through a substrate coated with a material containing microparticles that project through the surface of the coating;

The drawings illustrates a pest control material 11, directed particularly at insects, and more particularly at mosquitoes, comprising a surface 12 having microprojections 13.

Insects, at least in certain postures, and particularly when manipulating through apertures in netting, have but little ground clearance. Rubbing thorax and/or abdomen on the microprojections 13 will cause lesions in at least the outer layer, usually a waxy layer, which will give rise to rapid dehydration and open a path for fungal infection.

Figure 1:
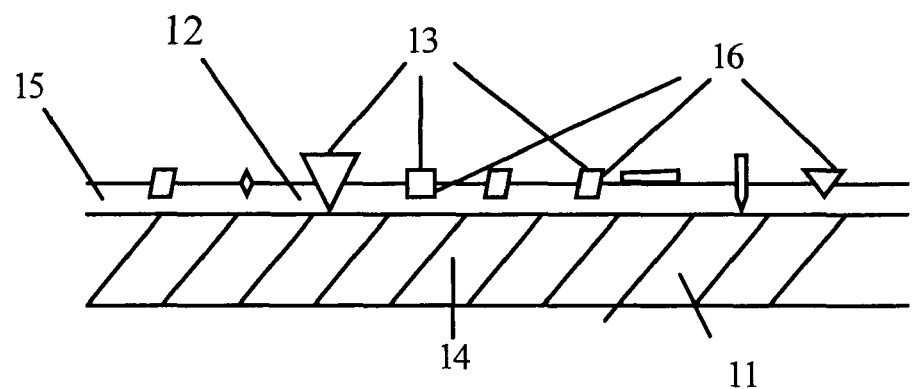

FIG. 1 shows a substrate 14 with a coating 15 providing the surface 12, the microprojections 13 being of particles of diatomaceous earth, polycarbonate or other material so sized in relation to the thickness of the coating 15 that they project from the surface 12. These microprojections 13 produce irritation in insects that make contact with the surface, disrupting the cuticle by abrasion and/or absorption of wax and leading to death by dehydration and/or invasion of the cuticle by fungal or other microbial pathogens in the environment.

To promote fungal or bacterial invasion of the insect, fungal or bacterial spores are introduced into the coating together with the abrasive and/or absorptive particles.

Figure 2:
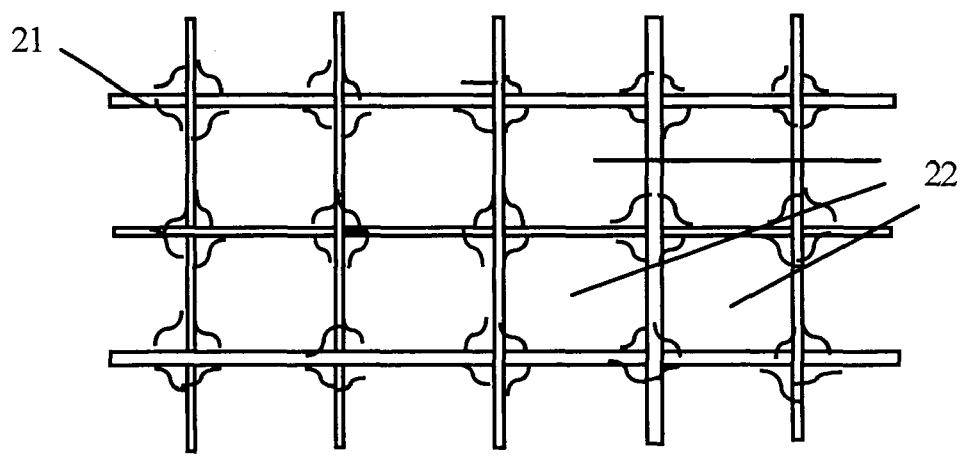
FIG. 2 is a face-on view of a coated mosquito net.

As shown in FIG. 2, the coating 15 is thin enough to minimise occlusion of apertures 22 in the net 21 and ensure that most of the particles are securely bound to the fabric. A balance needs to be struck between particle size and coating weight. A reason for choosing microparticles in a range of sizes from 5 μm upwards, is that they will be too large to enter the human respiratory system below the nasopharyngeal region if detached from the material through wear or washing.

Microprojection surfaces can be attached to fabrics such as woven, weft or warp-knitted nets, extruded nets or other woven, knitted, non-woven or composite (multilayer) fabrics, by coating, using a spray, padding or lick rollers in conventional fashion. Or microprojection surfaces can be attached by hot-melt coating, calendering, powder bonding or dispersing particles between filaments or fibres during extrusion processes such as melt-blowing or spunbonding. Other similar methods will be known to those skilled in the coating art. Microparticles can even be incorporated into or coated on to yarns and threads, the same being incorporated into fabrics using fabrication methods taking into account any increased surface friction that might result.

Aside from mosquito and like protective nets, fabrics coated so as to have sharp microprojections can be used for crop protection. They may be fashioned into tunnels, cloches and like artefacts, and, because they can be lightweight and permeable, they can allow through necessary sunlight and air.

Figure 3:
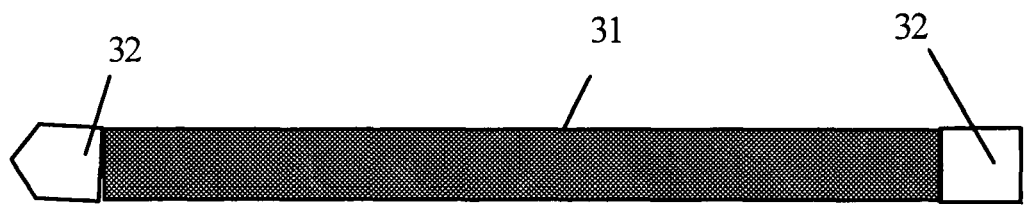
FIG. 3 shows a tree band.

Insects can be more vulnerable to sharp microprojections when in the larval or caterpillar stage, when they must necessarily crawl. Some insects, of course, though they may be equipped with wings, do not fly. Textile fabrics or other sheet or strip material such as rubber or plastic can be fashioned into a tree band 31, as shown in FIG. 3, using a simple fastening arrangement 32 such as Velcro®, which will militate against these pests.

Figure 4:
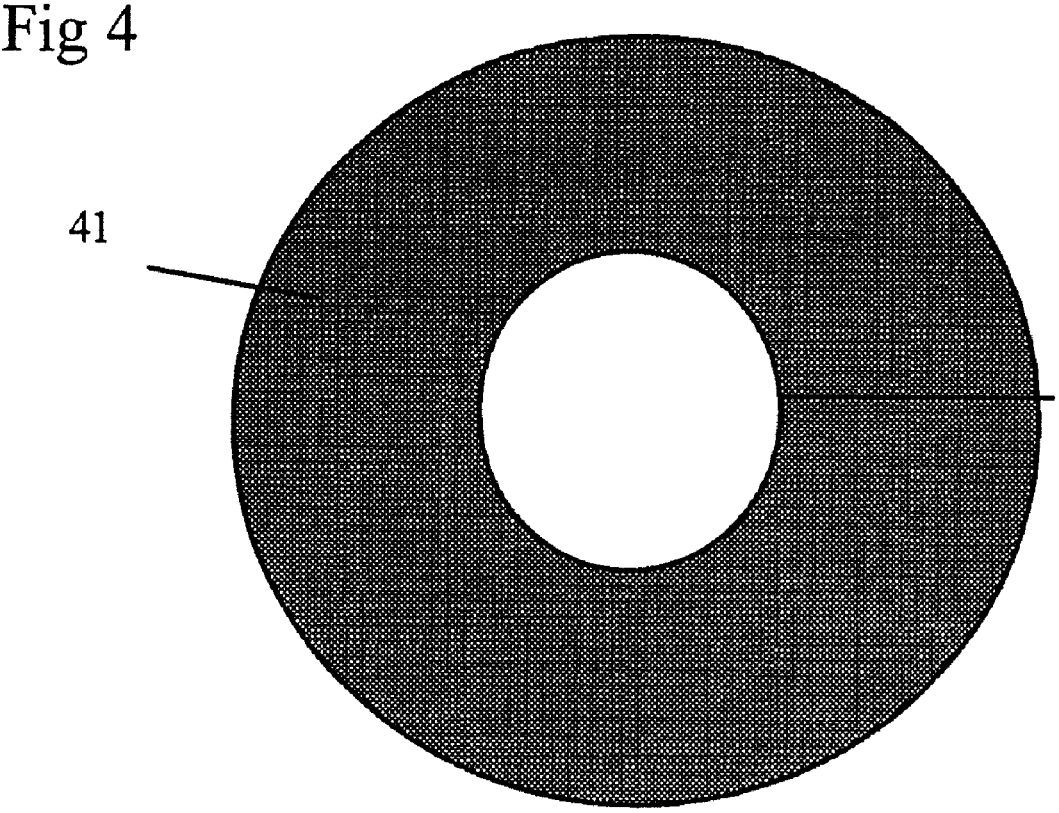
FIG. 4 shows a disc to be placed at base of plant.

Such material can also be effective against slugs and snails, which do not seemingly like to crawl over rough surfaces, hence the time-honoured use of broken egg shells as a mulch around brassicas. A mulch is, of course, subject to dispersion on account of wind, rain and earthworms. A fabric disc 41 as shown in FIG. 4 is inexpensive and will remain in place and effective for at least the growing season.

Different embodiments of pest control materials according to the invention can be used against (a) blood-sucking arthropods that transmit human pathogens or cause biting nuisance to man and/or livestock (mosquitoes, midges, black flies, sand flies, horse flies, stable flies, bot flies, tsetse, lice, fleas, ticks and mites); (b) insect pests of crops (flies, beetles, moths, thrips, aphids); (c) stored product pests (beetles, moths and flies); (d) defoliators or pests of fruit trees (gypsy moth and other Lepidoptera, ants); (e) slugs and snails that attack vegetable and fruit crops and flatworms that kill earthworms.

The invention claimed is:

1. A material comprising:
a fabric defining a plurality of apertures there through; and
threads of the fabric disposed adjacent the apertures and
having microprojections with uncoated abrasive or wax absorptive surfaces extending therefrom to partially occlude the apertures but allowing light and air to pass there through.

2. The material of claim 1, wherein the microprojections comprise particles extending out of a coating on the threads.

3. The material of claim 2, wherein the particles comprise a silica material.

4. The material of claim 2, wherein the particles have a particle size of at least 5 µm.

5. The material of claim 2, wherein the material comprises at least one of a net, a blanket, a hairnet, or a filter.

6. The material of claim 1, further comprising a chemical pest attractant.

7. The material of claim 1, further comprising a pathogen.

8. The material of claim 1, wherein the microprojections are thermofused to the threads of the fabric.

9. The material of claim 1, wherein the microprojections comprise one or more particulate materials with each particulate material being effective to abrade an exocuticle of an insect and to absorb wax from the exocuticle of the insect.

10. The material of claim 1, wherein the microprojections comprise one or more first particulate materials effective to abrade an exocuticle of an insect in combination with one or more second particulate materials effective to absorb wax from the exocuticle of the insect.

11. The material of claim 1, wherein the microprojections comprise a mixture of particulate materials that abrade an exocuticle of an insect, particulate materials that absorb wax from the exocuticle of the insect, and particulate materials that both abrade and absorb wax from the exocuticle of the insect.

12. A material comprising:
a fabric comprising fibers defining a plurality of apertures there through and providing a physical barrier to pests; and
a coating material disposed on the fibers, the coating material comprising microprojections with uncoated surfaces extending proximate the apertures, the uncoated surfaces of the microprojections effective to abrade or absorb wax from an exocuticle of an insect when in contact with the fabric while allowing light and air to pass through the fabric.

13. A material comprising:
a fabric comprising fibers defining a plurality of apertures there through; and
a coating material disposed on the fibers, the coating material comprising microprojections with uncoated surfaces extending proximate the apertures;
wherein a size of the apertures and presence of the microprojections are effective to act as a barrier to insects while allowing air and light to pass there through.

14. A material comprising:
a fabric comprising fibers defining a plurality of apertures there through;
a coating material disposed on the fibers, the coating material comprising microprojections with uncoated surfaces extending into the apertures, the uncoated surfaces of the microprojections effective to abrade or absorb wax from an exocuticle of an insect manipulating through a respective aperture while allowing light and air to pass through the fabric.

15. The material of claim 14, wherein the microprojections comprise particles.

16. The material of claim 15, wherein the particles comprise a silica material.

17. The material of claim 14, wherein the coating is thin enough so that the microprojections remain upstanding from the coating surface.

18. The material of claim 14, further comprising a chemical pest attractant.

19. The material of claim 14, further comprising a pathogen.

20. The material of claim 14, wherein the coating comprises at least one of a latex, acrylic, thermoplastic, or thermoset material.

21. The material of claim 14, wherein the material comprises at least one of a net, a blanket, a hairnet, or a filter.

22. The material of claim 21, wherein the material comprises a mosquito net.

23. The material of claim 14, wherein a ratio of a size of the microprojections to a thickness of the coating is greater than 1:1.

24. The material of claim 14, wherein the microprojections comprise one or more particulate materials with each particulate material being effective to abrade the exocuticle and to absorb wax from the exocuticle of the insect.

25. The material of claim 14, wherein the microprojections comprise one or more first particulate materials effective to abrade the exocuticle in combination with one or more second particulate materials effective to absorb wax from the exocuticle of the insect.

26. The material of claim 14, wherein the microprojections comprise a mixture of particulate materials that abrade the exocuticle of the insect, particulate materials that absorb wax from the exocuticle of the insect, and particulate materials that both abrade and absorb wax from the exocuticle of the insect.

* * * * *